United States Patent Office 3,164,601
Patented Jan. 5, 1965

3,164,601
ANALEPTICALLY ACTIVE N-SUBSTITUTED AMINONORCAMPHANE DERIVATIVES AND THEIR ACID ADDITION SALTS AND QUATERNARY AMMONIUM COMPOUNDS
Jan Thesing, Georg Seitz, Rudolf Hotovy, and Siegmund Sommer, all of Darmstadt, Germany, assignors to E. Merck Aktiengesellschaft, Darmstadt, Germany
No Drawing. Filed Oct. 9, 1961, Ser. No. 143,578
Claims priority, application Germany, Oct. 13, 1960, M 46,811
11 Claims. (Cl. 260—294.7)

The present invention relates to novel aminobicyclo-(2,2,1) heptanes of the formula

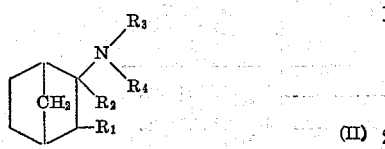

(II)

wherein:

$R_1$ is phenyl, naphthyl, phenylalkyl containing 7–8 carbon atoms, cyclohexyl, 5 or 6 membered sulfur or nitrogen containing heterocyclic radical or phenyl mono- or poly-substituted by alkyl containing 1–3 carbon atoms, alkoxy containing 1–3 carbon atoms, OH or halogen, $R_2$ is H, or alkyl containing 1–2 carbon atoms, $R_3$ is alkenyl or alkynyl each containing 2–5 carbon atoms, substituted alkyl containing 2–5 carbon atoms, substituted cyclo alkyl containing 5–6 carbon atoms, substituted aralkyl containing 7–8 carbon atoms, the substituted alkyl, cycloalkyl or aralkyl carrying one or more substituents selected from the group consisting of OH, halogen, alkoxy containing 1–3 carbon atoms, alkylthio containing 1–3 carbon atoms, $NH_2$ or substituted $NH_2$ wherein one or both of the hydrogen atoms may be replaced with alkyl containing 1–3 carbon atoms or wherein the nitrogen atom is a constituent of a 5 or 6 membered heterocyclic ring, $R_4$ is H, alkyl containing 1–3 carbon atoms or has the same significance as $R_3$ or $R_3$ and $R_4$ form a saturated 5 or 6 membered heterocyclic ring with the nitrogen atom which is substituted by =O, —OH, halogen and/or one or more alkyl groups containing 1–3 carbon atoms as well as their quaternary ammonium compounds and their pharmacologically acceptable acid addition salts.

The novel compounds according to the invention have a strong analeptic action and are excellently tolerated.

These novel compounds can be prepared by converting a compound of the formula

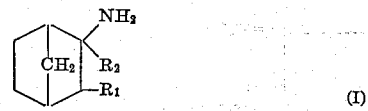

(I)

wherein $R_1$ and $R_2$ have the same significance as above into the corresponding N mono- or disubstituted compound of Formula II above by known alkylation methods and, if desired, transforming such compounds into their quaternary ammonium derivatives or pharmacologically acceptable acid addition salts.

Radical $R_1$, for example, can be phenyl, naphthyl, cyclohexyl or phenyl alkyl containing 7–8 carbon atoms or a sulfur or nitrogen containing 5 or 6 membered heterocyclic ring, such as pyridyl, piperidyl, thienyl or thiazolyl radicals. When $R_1$ is phenyl it can also be substituted additionally with one or more alkyl or alkoxy radicals containing 1–3 carbon atoms, —OH groups or halogen atoms, such as, for example, 2-fluorophenyl, 3-fluorophenyl, 3-chlorophenyl, 4-bromophenyl, 4-hydroxyphenyl, 3,4-dihydroxyphenyl, 3,4-dimethoxyphenyl, 4-ethoxyphenyl, p-tolyl, p-cumyl, m-xylyl and the like.

Radical $R_4$, for example, can be alkenyl or alkynyl groups containing 2–5 carbon atoms, such as vinyl, allyl, crotyl, pentenyl, ethynyl, butynyl, or alkyl groups containing 2–5 carbon atoms substituted by OH, halogen, alkoxy or alkylthio groups containing 1–3 carbon atoms or $NH_2$ or substituted $NH_2$ groups such as 2-hydroxy ethyl, 3-hydroxy butyl, 3,5-dihydroxy pentyl, bromo ethyl, 4-chlorobutyl, ethoxy pentyl, propoxy pentyl, methyl thiobutyl, ethyl thioethyl, amino ethyl, 5-amino pentyl, dimethyl amino butyl, diethyl amino propyl, pyrrolidino ethyl, 4-piperidino butyl and the like, and in addition the correspondingly substituted cyclopentyl, cyclohexyl, benzyl or phenylethyl radicals, such as 2-ethyl cyclopentyl, p-hydroxy cyclohexyl, p-methoxy benzyl, 2,4-dichlorophenyl ethyl and the like.

Radicals $R_3$ and $R_4$ also can form a 5 or 6 membered saturated ring with the nitrogen atom which also may contain further heteroatoms, such as nitrogen or oxygen, and be mono- or poly-substituted, such as the substituted pyrrolidino, pyrazolidino, piperidino, piperazino or morpholino radicals containing =O, OH, halogen, such as chlorine and bromine, and/or one or more allyl groups containing 1–3 carbon atoms as substituents.

The new compounds can be prepared by known methods from the corresponding primary amines by all usual methods of substituting of hydrogen atoms attached to nitrogen atoms. For example, the corresponding mono- and dialkenyl or alkynyl substituted compounds can be prepared from the halogen substituted alkenes and alkynes. The corresponding ω-hydroxy alkyl substituted compounds can be prepared with the aid of ethylene oxide or alkylene chlorhydrins. The ω-chloralkyl subsituted compounds can be prepared from such hydroxy compounds by treatment with thionyl chloride.

In addition, the primary amine starting compound can be treated with ω-halo carboxylic acid halides, treating the thus obtained ω-halo substituted carboxylic acid amides with amines or substituted amines to form the ω-amino substituted carboxylic acid amides and reducing these, for example, with lithium aluminum hydride to the corresponding ω-amino alkyl amines.

In the production of compounds wherein $R_3$ and $R_4$ are joined to produce an alkyl substituted heterocyclic ring, a primary amine of Formula I can be reacted with a corresponding α-ω-dihalogenated butane or pentane, such as 1,4-dibromo-2-ethyl-butane, 1,4-dichloro-2-propyl-butane, 1,5-dibromo-2-methyl pentane, 1,5-dibromo-2,3-dimethyl pentane, 1,5-diiodo-3-ethyl pentane and the like.

Compounds containing a 5 or 6 membered heterocyclic ring substituted by =O in the β or γ position, for example, can be produced by reacting an amine of Formula I with an ester of an α,β-unsaturated carboxylic acid or a halogen substituted carboxylic acid, condensation of the thus obtained bis-(carboxy alkyl)-amino compound according to Dieckmann, for example, with the aid of sodium in xylene, and subsequent saponification and decarboxylation of the 3-(or 4-)carboxy alkyl-4-(or 3-)oxo piperidino-(or pyrrolidino-)compound. Depending upon the structure of the α,β-unsaturated carboxylic acid ester or the halogenated carboxylic acid ester, for example, when a crotonic acid ester or a β-halogenated carboxylic acid ester alkylated in α or β position is used, the heterocyclic ring can also contain one or more alkyl groups in addition to the =O substituent in the β or γ position.

Compounds containing an =O substituent in the α position on the heterocyclic ring, for example, can be produced by reacting a primary amine of Formula I with a halogenated valeric acid ester or a halogenated butyric acid ester which may also contain alkyl substituents, saponifying the resulting carbalkoxy butyl- or carbalkoxy propyl-amino compound and closing the ring by splitting off water.

The substituents already contained in the nitrogen can be converted by a number of reactions. For example, the oxo group can be easily reduced to the hydroxy group and the hydroxy group can, if desired, be converted to a halogen by treatment with concentrated hydrohalic acids.

A number of the compounds according to the invention which have been produced are given in the following table:

The primary amines used as starting materials can be produced in a known manner, for example, according to the processes described in J. Amer. Chem. Soc., vol. 61 (1939), page 521, vol. 73 (1951), page 5068, and J. Org. Chem., vol. 8 (1943), page 373, by diene addition of $\omega$-nitrostyrene or the nuclearly substituted and/or $\beta$-methylated nitrostyrene derivatives on cyclopentadiene or dicyclopentadiene and subsequent hydrogenation which can be carried out in one step or stepwise.

The compounds according to the invention are very good analeptics. They were tested against the well known active phenmetrazine in a CNS (central nervous system) screening test according to Irvin (Arch. Int. Pharmacodyn., vol. 118, page 358, 1959). Such tests showed, for example, that 2-phenyl-3$\beta$-hydroxyethylamino-bicyclo-

| $R_1$ | $R_2$ | $R_3$ | $R_4$ | a=m.p. b=b.p. c=m.p. of hydrochloride |
|---|---|---|---|---|
| $C_6H_5$ | H | $CH_2=CH-CH_2$ | H | b=105° (0.3 mm. Hg) |
| $C_6H_5$ | H | $CH_2=CH-CH_2$ | $C_2H_5$ | b=127° (0.2 mm. Hg) |
| $C_6H_5$ | H | $CH_2-CH_2-OH$ | H | c=133° |
| $C_6H_5$ | H | $CH_2-CH_2-OH$ | $C_2H_5$ | c=202° |
| $C_6H_5$ | H | $CH_2-CH_2-OH$ | $CH_2-CH_2-OH$ | c=174° |
| $C_6H_5$ | H | $CH_2-CH_2-CH_2-OH$ | H | c=148° |
| $C_6H_5$ | H | $CH_2-CH_2-CH_2-OH$ | $C_2H_5$ | c=152° |
| $C_6H_5$ | H | $CH_2-CH_2-Cl$ | $CH_2-CH_2-Cl$ | c=184° |
| $C_6H_5$ | H | $CH\equiv C-CH_2$ | $C_2H_5$ | a=42° |
| $C_6H_5$ | H | $CH_2-CH_2-OCH_3$ | H | m.p. of nitrate=162° |
| $C_6H_5$ | H | $CH_2-CH_2-N(CH_3)_2$ | H | c=229° |
| $C_6H_5$ | H | $CH_2-CH_2-CH_2-N(CH_3)_2$ | H | c=224° |
| $C_6H_5$ | H | $CH_2-CH_2-CH_2-N\langle\hexagon\rangle$ | H | c=214° |
| $C_6H_5$ | H | $CH_2-CH_2-CH_2-N(CH_3)_2$ | $CH_3$ | c=276° |
| $C_6H_5$ | H | $CH_2-CH_2-CH_2-\overset{+}{N}(CH_3)_3$ | $CH_3$ | m.p. of Reineckate=184° |
| $C_6H_5$ | H | $CH_2-CH_2-CH_2-N\langle\hexagon\rangle$ | $CH_3$ | c=232° |
| $C_6H_5$ | H | $CH_2-CH_2-CH_2(C_2H_5)\overset{+}{N}\langle\hexagon\rangle$ | $CH_3$ | m.p. of picrate=199° |

| $R_1$ | $R_2$ | $N\begin{smallmatrix}R_3\\\\R_4\end{smallmatrix}$ | $R_4$ | a=m.p. b=b.p. c=m.p. of hydrochloride |
|---|---|---|---|---|
| $C_6H_5$ | H | N⟨hexagon⟩=O | | c=208° |
| $C_6H_5$ | H | N⟨hexagon with C=O⟩ | | a=116° |
| $C_6H_5$ | H | N⟨hexagon with OH, H⟩ | | c=198° |
| $C_6H_5$ | H | N⟨hexagon with CH_3⟩ | | b=128° (1 mm. Hg) |

Upon treatment of compounds of Formula II according to the invention their acid addition salts are obtained. As such acids those which yield pharmacologically acceptable salts can be used. For example, the following salts can be prepared: the chlorides, orthophosphates, nitrates, sulfates, maleates, fumarates, citrates, tartrates, oxalates, methane sulfates, sodium disulfonates, hemisuccinates, propionates, butyrates, ascorbates and acetates.

The quaternary ammonium derivatives can be obtained by reacting compounds of the Formula II with all compounds suited for quaternization, such as, for example, alkyl or aralkyl halides or dialkyl sulfates.

(2,2,1)-heptane and 2-phenyl-3-N-ethyl-N-allylaminobicyclo-(2,2,1)-heptane have three times the stimulating action. Analogous results were obtained with tests using a vibration cage (J. Aschoff, Pflüger's Arch. ges. Physiol. 254, 262, 1951) and with tests using a squirrel cage cylinder (S. Sommer and R. Hotovy, Arzneimittel-Forschung 11, 1961). About the same superiority in stimulating activity of the compounds according to the invention was found when they were compared with the most similar previously known compound, namely, 2-phenyl-3-dimethylaminobicyclo - (2,2,1) - heptane. In addition, for example, the 2-phenyl-3$\gamma$-hydroxypiperidinobicyclo-(2,2,1)-heptane showed an increased pressor adrenalin action on blood pressure which was 4–5 times that of the known substance with which it was compared. The 2-phenyl - 3 - bis - (β-hydroxyethyl)-aminobicyclo-(2,2,1)-heptane in addition to having an analeptic action causes a medium strong but lasting increase in blood pressure and furthermore, just as the 2-phenyl-3-N-ethyl-N-allylaminobicyclo-(2,2,1)-heptane, exhibits very excellent compatibility. The acute toxicity, for example, is only one-half of that of 2-phenyl-3-dimethylaminobicyclo-(2,2,1)-heptane.

In therapeutic application the compounds according to the invention can be administered in dosage units of 20 or 30 mg. in the form of tablets. In general, the daily dosage is 2–3 tablets and preferably administered in the morning and/or at noon. Indications, for example, are hypotension, states of exhaustion, convalescence and all states involving loss of efficiency and lack of drive.

The following examples will serve to illustrate a number of the compounds according to the invention and their preparation.

Example 1

21.5 g. of 2-phenyl-3-ethylamino-bicyclo-[2,2,1]-heptane were boiled under reflux with 17 g. of sodium bicarbonate and 12.7 g. of allyl bromide in 200 cc. of absolute alcohol while stirring. After about 12 hours, evolution of $CO_2$ ended and the solids filtered off washed with alcohol and the alcohol distilled off from the filtrate. The residue was taken up in 5% acetic acid, charcoal added and filtered. The filtrate was alkalized with aqueous sodium hydroxide and extracted with ether. The ether extract after drying with sodium sulfate was distilled off and the residue distilled under vacuum. The yield of 2-phenyl-3-N-ethyl-N-allyl-amino-bicyclo-[2,2,1]-heptane was 20.8 g. having a boiling point of 127° C. at 0.2 mm. Hg. Its picrate has a melting point of 155° C. after recrystallization from ethyl acetate.

Analogously, 3-N-ethyl-N-allyl-amino-bicyclo-[2,2,1]-heptanes carrying the following substituents in 2 position were obtained by reacting allyl bromide with the correspondingly substituted bicyclo-[2,2,1]-heptanes:

(a) p-Cuminyl
(b) Fluorophenyl
(c) (3',4'-dihydroxy)-phenyl
(d) p-Methoxyphenyl
(e) Benzyl
(f) Cyclohexyl
(g) Thiophenyl 2'
(h) Piperidyl 2'

Example 2

18.7 g. of 2-phenyl-3-amino-bicyclo-[2,2,1]-heptane were heated together with 4.4 g. of ethylene oxide in 20 cc. of benzene with the addition of 2 cc. of water in a bomb tube for 10 hours at 100° C. The reaction solution after cooling was washed with water, dried with sodium sulfate and the benzene distilled off. The residue was fractionated under vacuum. The 2-phenyl-3-β-hydroxyethyl-amino-bicyclo-[2,2,1]-heptane obtained had a boiling point of 174° C. Its hydrochloride melted at 133° C. after recrystallization from isopropanol-ether.

Example 3

81.5 g. of 2-phenyl-3-amino-bicyclo-[2,2,1]-heptane were stirred with 46.2 g. of ethylene oxide in 150 cc. benzene and 10 cc. of water in an autoclave for 10 hours at 100° C. The resulting benzene solution was washed with water, dried and the benzene distilled off. The residue was dissolved in acetone and neutralized with HCl in ether. The hydrochloride, which precipitated, melted at 1740° C. after recrystallization from isopropanol-ether. The yield of 2-phenyl-3-bis-(β-hydroxyethyl)-amino-bicyclo-[2,2,1]-heptane hydrochloride was 105 g.

Analogously, 3 - bis-(β-hydroxyethyl)-amino-bicyclo-[2,2,1]-heptanes carrying the following substituents in the 2 position were obtained by reacting the correspondingly substituted bicyclo-[2,2,1]-heptanes with ethylene oxide:

(a) m-Xylyl
(b) p-Fluorophenyl
(c) o-Chlorophenyl
(d) p-Ethoxy phenyl
(e) (3',4'-dihydroxy)-phenyl
(f) Phenylethyl

Example 4

96 g. of thionyl chloride were solwly added to 62.56 g. of 2 - phenyl - 3 - bis-(β-hydroxyethyl)-amino-bicyclo-[2,2,1]-heptane. After the reaction subsided the reaction mixture was heated for a further short time and the excess of thionyl chloride distilled off under vacuum. The residue was recrystallized from isopropanol. 52 g. of the hydrochloride of 2-phenyl-3-bis-(β-chloroethyl)-amino-bicyclo-[2,2,1]-heptane having a melting point of 184° C. were obtained.

Analogously, the 2-m-xylyl-3-bis-(β-chloroethyl) derivative was obtained from the 2-m-xylyl-3-bis-(β-hydroxyethyl) derivative.

Example 5

10.75 g. of 2-phenyl - 3-ethyl-amino-bicyclo-[2,2,1]-heptane were heated with 4.72 g. of trimethylenechlorhydrin for 8 hours in a bomb tube at 150° C. The reaction product was dissolved in water, alkalized with NaOH and extracted with ether. The ether was distilled off from the extract, leaving 7.5 g. of 2-phenyl-3-N-ethyl-N-γ-hydroxypropyl-amino-bicyclo-[2,2,1]-heptane boiling at 165–170° C. at 0.05 mm. Hg. The hydrochloride melted at 152° C. after recrystallization from isopropanol.

Example 6

52 g. of β-bromopropionyl chloride were dropped into 112.2 g. of 2-phenyl-3-amino-bicyclo-[2,2,1]-heptane in 700 cc. of benzene while stirring and cooling to maintain a temperature of about +30° C. and the mixture then boiled under reflux for 10 minutes. The reaction mixture was washed with water, dilute NaOH and again with water. After drying over sodium sulfate the benzene was distilled off. 96 g. of crude 2-phenyl-3-β-bromopropionyl-amino-bicyclo-[2,2,1]-heptane remained as a tough oil. After recrystallization from ethyl acetate-petroleum ether it had a melting point of 118–120° C.

43 g. of such crude product in 70 cc. of benzene were heated with 144 g. of a 10% solution of dimethylamine in benzene for 6 hours at 120° C. in an autoclave. The benzene solution was shaken out with 5% HCl and the resultant acid extract alkalized with NaOH. The 2-phenyl - 3 - β - dimethylamino-propionyl-amino-bicyclo-[2,2,1]-heptane which separated out was taken up in an ample quantity of benzene, washed with water and dried. Upon distilling off the benzene the residue was recrystallized from cyclohexane-petroleum ether. Melting point 92° C.

19.7 g. of such product in 110 cc. of absolute tetrahydrofurane were dropped into a solution of 3.36 g. of lithium aluminum hydride in 70 cc. absolute tetrahydrofurane while stirring and the mixture then refluxed for 8 hours. After cooling, 3.4 cc. of water, 3.4 cc. of 15% NaOH and then 10 cc. of water were added. The mixture was then filtered and the tetrahydrofurane distilled off from the filtrate. The residue was taken up in ether and the resulting solution shaken out three times with 5% HCl. The acid extract was alkalized with NaOH and extracted with ether and the ether distilled off from the ether extract. Crude 2-phenyl-3-γ-dimethylamino-propyl-amino-bicyclo-[2,2,1]-heptane remained as a residue which was converted to its hydrochloride in alcoholic solution with hydrochloric acid in ether. After recrystallization from alcohol-ether the hydrochloride melted at 222° C.

*Example 7*

3.85 g. of 2-phenyl-3-γ-piperidino-n-propyl-amino-bicyclo-[2,2,1]-heptane hydrochloride were heated to 100° C. with 1.4 g. of sodium formate, 1.05 g. of 30% formaldehyde solution, 1.5 g. formic acid and 7 cc. of water for 17 hours (until $CO_2$ evolution ceased). The reaction mixture was strongly alkalized with NaOH and the methylation product formed, 2-phenyl-3-N-methyl-N-γ-piperidino-propyl)-amino - bicyclo-[2,2,1]-heptane, extracted with ether and converted to its dihydrochloride with HCl in ether. The melting point of the dihydrochloride was 232°C.

*Example 8*

38 g. of 2-phenyl-3-amino-bicyclo-[2,2,1]-heptane were heated with 80 g. acrylic acid ethyl ester in 40 cc. of absolute alcohol for 14 hours at 150° C. in an autoclave. Substantially the same results were obtained by refluxing the mixture for 100 hours. The alcohol was distilled off under vacuum and the residue fractionated under vacuum. 51 g. of 2-phenyl-3-bis-(β-carbethoxyethyl)-amino-bicyclo-[2,2,1]-heptane of a boiling point of 205° C. at 0.05 mm. Hg were obtained. Its hydrochloride melts at 158° C.

The same compound was obtained by reacting 2-phenyl-3-amino-bicyclo-[2,2,1]-heptane with β-halopropionic acid ethyl ester in the presence of basic condensing agents, such as sodium bicarbonate, sodium alcoholates, tertiary amines and the like.

7.4 g. of such compound in 10 cc. of absolute xylene were dropped into 15 cc. of absolute xylene containing 0.6 g. of powdered sodium at 80° C. The mixture was stirred for 3 hours at 60° C. and then 30 cc. of water were added to the reaction mixture. The xylene solution was separated off, dried and the xylene distilled off. Crystallized 2 - phenyl-3-β-carbethoxy-γ-oxopiperidino-bicyclo-[2,2,1]-heptane·HCl was obtained from the residue by treatment with HCl in ether. Its melting point after recrystallization from isopropanol was 198° C.

1.7 g. of such product were boiled under reflux with 10 cc. of concentrated HCl for 10 hours. The hydrochloride slowly went into solution. The HCl was distilled off under vacuum and the residue recrystallized from acetone. 1.2 g. of 2-phenyl-3-γ-oxopiperidino-bicyclo-[2,2,1]-heptane of a melting point of 208° C. were obtained.

*Example 9*

3.2 g. of 2-phenyl-3-γ-oxopiperidino-bicyclo - [2,2,1]-heptane hydrochloride were shaken in 50 cc. of water with 1 g. of Raney nickel under hydrogen at a gauge pressure of 100 atmospheres and a temperature of 80° C. The calculated quantity of hydrogen was taken up rapidly. This catalyst was filtered off and the filtrate evaporated to dryness under vacuum. The residue was recrystallized from isopropanol-ether. After a further recrystallization from water, the melting point of the 2-phenyl-3-γ-hydroxy-piperidino-bicyclo-[2,2,1]-heptane was 198° C.

3 grams of such product were heated with 25 cc. of concentrated HCl for 2 hours at 100° C. in a bomb tube. The resulting 2 - phenyl - 3 - γ-chloropiperidino - bicyclo-[2,2,1]-heptane HCl was recovered from the reaction mixture in the usual manner.

*Example 10*

10.5 g. of δ-bromovaleric acid ethyl ester were refluxed with 18.7 g. of 2-phenyl-3-amino-bicyclo-[2,2,1]-heptane in 30 cc. of toluene for 22 hours. The reaction solution was diluted with 20 cc. of toluene and washed with water. After drying with sodium sulfate, the toluene was distilled off under vacuum, the residue dissolved in ethyl acetate and acidified with HCl in ether. 7.9 g. of 2-phenyl-3-δ-carbethoxybutyl-amino-bicyclo-[2,2,1]-heptane·HCl of a melting point of 132° C. were obtained.

Upon saponification of such product with dilute NaOH, the free acid was obtained which crystallized out upon adjusting the pH of the saponification solution to 3.9.

4 g. of this product, namely, 2-phenyl-3-δ-carboxybutyl-amino-bicyclo-[2,2,1]-heptane were heated for 15 minutes (until evolution of steam ceased) at 180° C. The residue crystallized upon cooling and was recrystallized from ethyl acetate. The yield was 3.5 g. of 2-phenyl-3-α-oxo-piperidino-bicyclo-[2,2,1]-heptane of a melting point of 116° C.

*Example 11*

18.7 g. of 2-phenyl-3-amino-bicyclo-[2,2,1]-heptane and 25.3 g. of 1,4-dibromo-2-methyl butane were refluxed with 96 g. of 10% NaOH for 10 hours. The reaction mixture was extracted with ether, the extract washed with water, dried with sodium sulfate and the ether distilled off. The residue was distilled under vacuum to obtain the pure 2-phenyl-3-(2' - methyl - pyrrolidino) - bicyclo - [2,2,1]-heptane of a boiling point of 128° C. at 1 mm. Hg.

Analogously, 3-(2'-methyl-pyrrolidino)-bicyclo-[2,2,1]-heptanes having the following substituents in the 2 position were obtained:

(a) p-Propoxyphenyl
(b) (3',4'-dichloro)-phenyl
(c) Thiophenyl-2'

*Example 12*

37.4 g. of 2-phenyl-3-amino-bicyclo-[2,2,1] - heptane were heated with 9.5 g. of methyl-2-chloroethyl ether for 14 hours at 120° C. After cooling down the melt it was taken up in ether, washed with water and the ether distilled off. The residue was dissolved in dilute HCl and decolorized with charcoal, filtered and alkalized with NaOH. The base which crystallized out was taken up in ether, dried with sodium sulfate, filtered and the ether distilled off. The residue (22 g.) was dissolved in dilute $HNO_3$ whereupon 19 g. of the nitrate of 2-phenyl-3-β-methoxyethyl-amino-bicyclo-[2,2,1] - heptane crystallized out after a short time. After recrystallization from alcohol-ether its melting point was 162° C.

Analogously, when methyl-2-chloroethyl sulfide was used the 2 - phenyl - 3-β-methylthioethyl-amino-bicyclo-[2,2,1]-heptane was obtained.

*Example 13*

6.16 g. of 2-phenyl-3-β-methoxyethyl - amino - bicyclo-[2,2,1]-heptane were heated with 2.2 g. of a 30% formaldehyde solution, 1.4 g. sodium formate, 1.8 g. of formic acid and 10 cc. of water on a steam bath until evolution of $CO_2$ ceased. The solution was then alkalized with NaOH and extracted with ether. The extract was washed with water, dried with sodium sulfate and the ether distilled off. The residue was dissolved in absolute alcohol and neutralized with HCl in ether. 5 g. of the hydrochloride of 2-phenyl-3-N-β-methoxy-ethyl-N-methyl - amino - bicyclo-[2,2,1]-heptane of a melting point of 182° C. were obtained.

*Example 14*

20 g. of 2-phenyl-3-N-ethyl-amino-bicyclo-[2,2,1]-heptane·HCl were boiled under reflux with 20 g. sodium bicarbonate, 11.6 g. propargyl bromide and 150 cc. of absolute alcohol for 24 hours while stirring. The excess sodium bicarbonate was filtered off and the alcohol distilled off under vacuum. The residue was taken up in ether and filtered. The filtrate was extracted with 5% acetic acid and the acid extract alkalized with NaOH. The precipitated base was taken up in ether, dried with sodium sulfate and the ether distilled off. The 2-phenyl-3-N-ethyl-N-propargyl-amino-bicyclo - [2,2,1] - heptane which remained as the residue had a melting point of 42° C. after recrystallization from isopropyl ether.

Example 15

Analogously to Example 1, the following compounds were obtained by reacting the corresponding alkenyl halides and amino-bicyclo-[2,2,1]-heptane derivatives:

(a) 2-phenyl-3-N-ethyl-N-vinyl-amino-bicyclo - [2,2,1]-heptane
(b) 2-p-fluorophenyl-3-N-ethyl-N-butadienyl-amino-bicyclo[2,2,1]-heptane
(c) 2-phenyl-3-N-ethyl-N-pentenyl-(3')-amino - bicyclo-[2,2,1]-heptane
(d) 2-(3',4'-dimethoxyphenyl)-3-N-ethyl-N-allyl - amino-bicyclo-[2,2,1]-heptane.

We claim:
1. A compound selected from the group consisting of:
(1) a compound of the formula

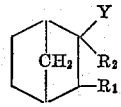

wherein
R$_1$ is selected from the group consisting of phenyl, naphthyl, phenyl alkyl of 7 to 8 carbon atoms, cyclohexyl, pyridyl, piperidyl, thienyl-2', dihydroxyphenyl, monohydroxyphenyl, halophenyl, dihalophenyl, dimethoxyphenyl, alkoxyphenyl wherein the alkoxy substituent is of 1–3 carbon atoms, and alkylphenyl wherein the alkyl substitutent is of 1–3 carbon atoms;
R$_2$ is selected from the group consisting of hydrogen and alkyl of 1–2 carbon atoms;
Y is selected from the group consisting of 2-oxopiperidino, 3-oxopiperidino, 4-oxopiperidino, 3-methyl pyrrolidino, 4-hydroxy piperidino, 4-chloropiperidino, and

in which:
R$_3$ is selected from the group consisting of vinyl, allyl, crotyl, propargyl, pentenyl, ethynyl, butynyl, butadienyl, 2-hydroxy ethyl, 3-hydroxy propyl, 3-hydroxy butyl, 3,5-dihydroxy pentyl, bromo ethyl, chloro ethyl, 4-chlorobutyl, methoxy ethyl, ethoxy pentyl, propoxy pentyl, methyl thioethyl, methyl thiobutyl, ethyl thioethyl, amino ethyl, 5-aminopentyl, dimethylamino ethyl, dimethylamino propyl, dimethylamino butyl, diethylamino propyl, pyrrolidino ethyl, 3-piperidino propyl, 4-piperidino butyl, 2-ethyl cyclopentyl, p-hydroxy cyclohexyl, p-methoxy benzyl, and 2,4-dichlorophenyl ethyl, and
R$_4$ is selected from the group consisting of hydrogen, alkyl of 1–3 carbon atoms and R$_3$;
(2) the non-toxic pharmaceutically acceptable acid addition salts thereof; and
(3) the quaternary ammonium salts thereof obtained by reacting the free base with a member selected from the group consisting of alkyl halides, aralkylhalides and dialkyl sulfates.

2. 2 - phenyl - 3 - N - ethyl - N - allyl - amino - bicyclo-[2,2,1]-heptane.
3. 2 - phenyl - 3 - β - hydroxy - ethyl -amino - bicyclo-[2,2,1]-heptane.
4. 2 - phenyl - 3 - bis - (β - hydroxyethyl) - amino-bicyclo-[2,2,1]-heptane.
5. 2 - phenyl - 3 - γ - hydroxypiperidino - bicyclo-[2,2,1]-heptane.
6. 2 - phenyl - 3 - allylamino - bicyclo-(2,2,1)-heptane.
7. 2 - phenyl - 3 - N - ethyl - N - (β - hydroxyethyl)-amino-bicyclo-(2,2,1)-heptane.
8. 2 - phenyl - 3 - (γ - hydroxypropylamino) - bicyclo-(2,2,1)-heptane.
9. 2 - phenyl - 3 - N - ethyl - N - (γ - hydroxypropyl)-amino-bicyclo-(2,2,1)-heptane.
10. 2 - phenyl - 3 - bis - (β - chloroethyl) - amino-bicyclo-(2,2,1)-heptane.
11. 2 - phenyl - 3 - N - ethyl - N - propargyl - amino-bicyclo-(2,2,1)-heptane.

References Cited in the file of this patent
UNITED STATES PATENTS

| | | |
|---|---|---|
| 2,904,591 | Hanell et al. | Sept. 15, 1959 |
| 2,955,073 | De Beer | Oct. 4, 1960 |
| 2,986,573 | Topliss et al. | May 30, 1961 |
| 3,014,037 | Rorig | Dec. 19, 1961 |
| 3,074,961 | Poos | Jan. 22, 1963 |

FOREIGN PATENTS

| | | |
|---|---|---|
| 223,025 | Australia | July 29, 1959 |
| 1,110,159 | Germany | July 6, 1961 |

OTHER REFERENCES

Parham et al.: Journal of the American Chemical Society, vol. 73: pp. 5068–5070 (1951).

IRVING MARCUS, *Primary Examiner*.

NICHOLAS S. RIZZO, WALTER A. MODANCE, *Examiners*.